Feb. 24, 1925.
J. G. POORMAN
1,527,702
EGG TURNING APPARATUS
Filed March 15, 1924
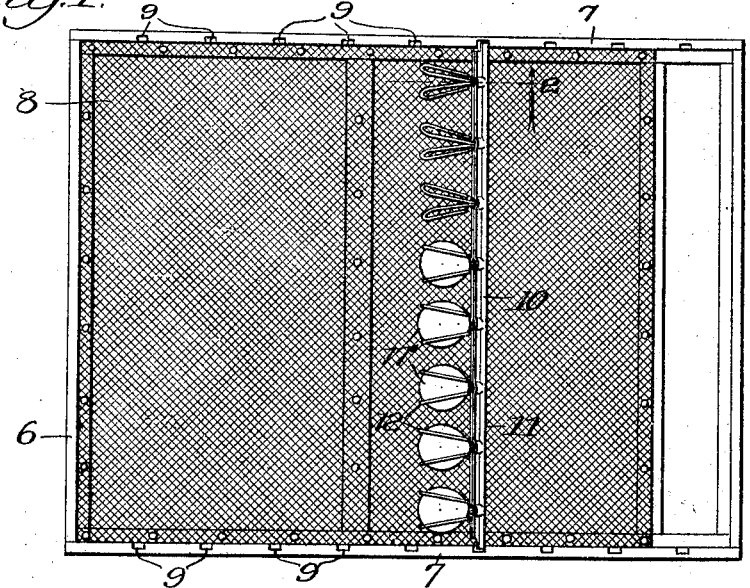
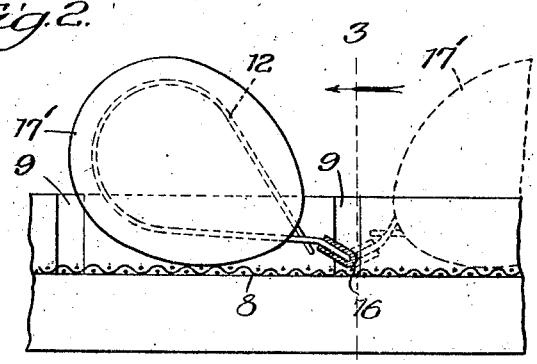
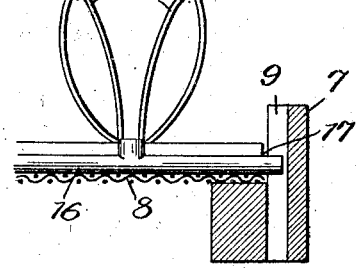
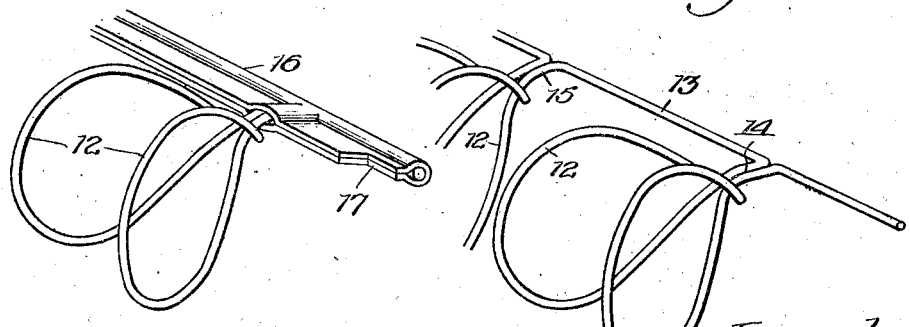
Inventor:
John G. Poorman,
By Dyrenforth, Lee, Chritton & Wiles,
Attys

Patented Feb. 24, 1925.

1,527,702

UNITED STATES PATENT OFFICE.

JOHN G. POORMAN, OF TINLEY PARK, ILLINOIS.

EGG-TURNING APPARATUS.

Application filed March 15, 1924. Serial No. 699,449.

*To all whom it may concern:*

Be it known that I, JOHN G. POORMAN, a citizen of the United States, residing at Tinley Park, in the county of Cook and State of Illinois, have invented a new and useful Improvement in Egg-Turning Apparatus, of which the following is a specification.

My invention relates, generally stated, to apparatus for use in the artificial hatching of eggs and involving, as an element thereof, devices whereby the eggs, to be hatched, may be turned, as desired, from one position to another.

One of my objects is to provide a novel, simple and economical construction of holder for the eggs whereby a plurality of the latter may be simultaneously turned from one position to another as a unit. Another object is to provide a combined incubator tray and egg-turning device, of such constructions that the device may be readily applied to, and removed from, assembled position relative to the tray and when in position thereon may be readily operated to turn the eggs, and by the use of which the egg-turning devices may be readily removed from the tray, to permit the tray to be used as a plain tray for the holding of the eggs, whereby the tray may be used in the hatching of the eggs not only during the period that turning of the eggs is required, but also after this period has elapsed, thereby rendering unnecessary the use of an additional tray for receiving the eggs after the egg-turning period. Another object is to provide a construction whereby the turning of the eggs may be accurately performed and whereby each egg will be caused to be shifted, in the turning operation, to the desired position. Another object of the invention is to provide a construction whereby the various egg-holders may be readily shifted from one position to another in the tray and the positions of the respective devices interchanged, as desired, which is of particular advantage where the temperature throughout the incubator in connection with which the trays are used, is not uniform throughout the heated chamber; and other objects as will be manifest from the following description.

Referring to the accompanying drawing:—

Figure 1 is a plan view of a combined incubator tray and egg-holding and turning device, constructed in accordance with my invention, one only of the plurality of said devices, which will be used with the tray shown, being illustrated. Figure 2 is an enlarged, broken section taken at the line 2 on Fig. 1 and viewed in the direction of the arrow, an egg being shown in the holder, which latter is shown in one turned position by full lines and in its other turned position by dotted lines. Figure 3 is a broken section taken at the line 3 on Fig. 2 and viewed in the direction of the arrow. Figure 4 is a perspective view of one end of the egg-holding and turning device; and Figure 5, a perspective view of the wire elements which form the egg-holding clips of the device.

An incubator egg-tray of common construction, except for the feature thereof hereinafter described, is represented at 6, it being of general rectangular form and comprising a frame 7 equipped with a wire mesh bottom 8. The inner surfaces of opposite side walls of the tray, contain vertically-extending grooves represented at 9 which are arranged in directly-opposed position as shown, these grooves being adapted to receive the egg-holding and turning devices, one of which is represented at 10, it being understood that each set of the grooves 9 are adapted to receive one of these devices.

The device 10, according to the particular illustrated embodiment of my invention, comprises a bar 11 shown as formed of sheet metal bent upon itself as shown, and a series of egg clips, each formed of a pair of spring wire loops 12 rigidly connected with the bar and extending laterally therefrom in a plane lengthwise of the bar. One loop 12 of each set thereof is shown as formed integrally with the adjacent one of the loops of the next set thereof, one end of each of these loops being connected together by the portions of the wire represented at 13, 14 and 15, the portions 14 and 15 extending substantially at right angles to the portion 13. The portions 13, 14 and 15 are held in interlocked position between the opposing portions of the metal strip forming the bar 10 and bent as stated, these opposing portions being preferably pressed flatwise together at those portions thereof which do not have any parts of the wire interposed therebetween, as represented in Fig. 4, the part of the bar 10 which surrounds the portions 13 of the wires being curved as represented at 16.

The loops of each set thereof preferably diverge in a direction away from the bar 10 and are so shaped as to receive, and firmly hold, therein, an egg 17' which would be positioned therein with its smaller end adjacent the bar 10 as shown.

The plate portions of the bar 10 at opposite ends thereof are cut away, as represented at 17, at which portions the egg-holding device is adapted to be positioned in a set of the opposing grooves 9, as shown in Figs. 1, 2 and 3, and adapt the device for rotation to the extreme positions shown in the dotted and the full lines in Fig. 2, the said device, in the particular construction shown, resting upon the wire mesh 8.

The egg-holding device is thus adapted to be rotated from one to the other of the positions shown in Fig. 2, the eggs resting at their opposite sides, respectively, in the two extreme positions, on the wire mesh 8, the turning movement referred to being readily effected by hand. Inasmuch as the axis about which the egg-holding device rotates, is located below the center of gravity of the eggs, the device, when rotated to either of the positions shown, remains in such position, against accidental displacement, and as each egg is separately held in the holding device, against movement therein, each egg, in the turning movement, is accurately turned each time the holder device is rotated, which insures the proper turning of all the eggs. Furthermore, danger of breakage of the eggs, in the turning movement, is negligible.

In the use of the structure, after the egg-turning period has elapsed, the tray 6 may be used as an ordinary incubator tray upon which to support the eggs for subjecting them to the further hatching treatment, by removing the eggs from the holders and the latter from the trays and placing the eggs on the wire mesh bottom 8, thereby rendering unnecessary the use of an additional tray for the further hatching operation. Furthermore, the holders may be shifted from one set of the grooves to another thereof, as desired, to change the relative positions of the holders in the tray, to subject the eggs to the same amount of heat, over a given period, as for example where the incubator chamber in which the trays are placed is not uniformly heated.

It will furthermore be noted that the structure is free of mechanical parts which are liable to become impaired or so disarranged that the functioning of the holders as turning devices, will be injuriously affected.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. An egg-holding and turning device comprising a bar formed from sheet metal bent upon itself, and a series of wire clips extending laterally from said bar with portions of said clips interposed between opposing portions of the sheet metal forming said bar.

2. An egg-holding and turning device comprising a bar formed from sheet metal bent upon itself, and a series of wire clips extending laterally from said bar, each clip being formed of a pair of loops, the loop of each pair being integral with an adjacent loop of an adjacent pair thereof.

3. An egg-holding and turning device comprising a bar formed from sheet metal bent upon itself, and a series of wire clips extending laterally from said bar, each of said clips being formed with portions arranged at angles to each other and interposed at said portions between opposing portions of the sheet metal forming said bar and preventing rotation of said clips relative to said bar.

4. An egg-holding and turning device comprising a bar formed from sheet metal bent upon itself, and a series of wire clips extending laterally from said bar, each of said clips being formed of a pair of loops, one loop of each pair being integrally connected with an adjacent loop of an adjacent pair thereof by portions extending at angles to each other, said clips being interposed at said portions between opposing portions of the sheet metal forming said bar and preventing rotation of said clips relative to said bar.

JOHN G. POORMAN.